United States Patent [19]

Montiglio et al.

[11] 4,068,038

[45] Jan. 10, 1978

[54] STABILIZED CHROMIUM DIOXIDE COMPOSITIONS

[75] Inventors: Ugo Montiglio; Pierfrancesco Aspes, both of Alessandria; Carlo Scotti, Voghera; Giampiero Basile, Alessandria, all of Italy

[73] Assignee: Montecatini Edison S.p.A., Milan, Italy

[21] Appl. No.: 609,542

[22] Filed: Sept. 2, 1975

Related U.S. Application Data

[62] Division of Ser. No. 359,961, May 15, 1973.

[30] Foreign Application Priority Data

May 24, 1972 Italy .................................... 24773/72
Mar. 9, 1973 Italy .................................... 21398/73

[51] Int. Cl.$^2$ ............................................. C01G 37/02
[52] U.S. Cl. ...................................... 428/404; 428/900; 428/539; 427/127; 427/215; 252/62.51; 423/274; 423/607

[58] Field of Search .................... 252/62.51; 423/607, 423/274; 427/127, 215, 219; 428/404, 539, 900

[56] References Cited

U.S. PATENT DOCUMENTS

| | | | |
|---|---|---|---|
| 3,686,031 | 8/1972 | Balthis | ............................. 252/62.51 |
| 3,687,726 | 8/1972 | Pye | ................................. 252/62.51 X |
| 3,769,087 | 10/1973 | Leutner et al. | ............... 252/62.51 X |

FOREIGN PATENT DOCUMENTS

| | | | |
|---|---|---|---|
| 4,718,509 | 5/1972 | Japan | ................................. 252/62.51 |
| 4,739,077 | 10/1972 | Japan | ................................. 252/62.51 |

*Primary Examiner*—Jack Cooper
*Attorney, Agent, or Firm*—Hubbell, Cohen, Stiefel & Gross

[57] ABSTRACT

Composition comprising a highly ferromagnetic $CrO_2$ having deposited on the surface thereof an insoluble or sparingly soluble compound, thereby rendering the composition essentially non-reactive to water or oxidizable organic substances. Compound comprises either an oxide or hydroxide of Si and/or Ti.

9 Claims, No Drawings

STABILIZED CHROMIUM DIOXIDE COMPOSITIONS

This is a division of application Ser. No. 359,961, filed May 15, 1973.

CROSS REFERENCE TO RELATED APPLICATION

This application relates to copending application executed Apr. 2, 1973, Ser. No. 350,033, filed on or about Apr. 11, 1973, by Ugo Montiglio, Pierfrancesco Aspes, and Giampiero Basile (Docket T.1676), entitled "Modified Chromium Dioxide Composition and Method of Preparing the Same", the contents of said copending application being incorporated herein by reference.

BACKGROUND OF THE INVENTION

1. Field of the Invention

The present invention relates to a particulate ferromagnetic chromium dioxide composition in which the particles are treated so as to render them particularly suited for use in magnetic recording.

Chromium dioxide finds application in various fields of magnetic recording, such as, for instance, in magnetic tapes for audio and video recordings, in tapes and memories for computers, in magnetic discs and cards, etc.

The ferromagnetic characteristics that make chromium dioxide particularly suited for such uses are mainly related to the high coercive force (Hc) which this material offers when it is obtained in an acicular form with a high length to width axial ratio, to its high saturation magnetization value ($\sigma_s$) and its residual magnetization ($\sigma_r$). In addition, the facility for orientation which the particles exhibit when they are spread on a magnetic tape enables one to obtain hysteresis cycles of a configuration much closer to rectangular than would be possible when using conventional ferromagnetic compounds (e.g., $\gamma Fe_2O_3$ and $Fe_3O_4$).

2. Description of the Prior Art

According to the prior art, ferromagnetic chromium dioxide of the above indicated desired characteristics has been obtained according to several different processes. In some processes it has been obtained in an unmodified form, while in other processes it is admixed with suitable modifiers, some of which improve the granulometry or particle size and distribution of the product, others of which vary its ferromagnetic characteristics, such as the coercive force or the Curie temperature.

Processes for preparing pure, unmodified chromuim dioxide exhibiting high ferromagnetic properties are described, for instance in Italian Pat. No. 894,564 and in Italian Pat. No. 922,283.

Processes for preparing modified chromium dioxide having equally good ferromagnetic characteristics, are described, for instance, in Italian Patent No 606,749 to duPont and in Italian Patent application No. 23466 A/72, as well as in said U.S. application Ser. No. 350,033, filed on or about Apr. 11, 1973, by Ugo Montiglio, Pierfrancesco Aspes, and Giampiero Basile, entitled "Modified Chromium Dioxide Composition and Method of Preparing the Same".

However, it has been observed that the $CrO_2$ displays a certain reactivity towards water and organic substances, particularly towards those containing easily oxidizable functional groups such as, for instance, hydroxy or amino groups.

These functional groups are often present in the resins used in the formulations for magnetic tapes and, upon their oxidation by the $CrO_2$, it (the $CrO_2$) is in turn reduced, at least on the surface, to chromium compounds of a lower valence, in particular, to $Cr_2O_3$, which $Cr_2O_3$ is not ferromagnetic.

From the foregoing it will be seen that if $CrO_2$ is incorporated into a magnetic tape and this is subjected to recording, after a certain period of time there will be observed a drop in the output level, which drop is related to the lowering of the residual magnetization of the ferromagnetic pigment.

One method for overcoming this drawback is described in Italian Patent No. 865,839 to duPont, and involves reducing the surface of the chromium dioxide particles by means of suitable reducing agents, such as $H_2S$, alkaline bisulfites, and alcohols having from 1 to 18 carbon atoms.

The thus treated chromium dioxide, which under X-ray diffraction examination shows a line corresponding to an interplanar distance of $3.151 \pm 0.005$ A, is much less reactive toward water and organic substances containing easily oxidizable functional groups.

This reducing treatment has, however, a serious drawback, namely, it tends to lead to a very pronounced deterioration of the magnetic characteristics of the $CrO_2$, so that the value of residual magnetization drops to about 30% of that of the untreated product.

SUMMARY OF THE INVENTION

The present invention provides a chromium dioxide based ferromagnetic composition that exhibits a very low reactivity toward water and oxidizable organic substances in general.

The invention further provides a chromium dioxide based ferromagnetic composition which, although stable, exhibits high ferromagnetic characteristics.

According to the invention, there is deposited onto the surface of the $CrO_2$ particles one or more insoluble or sparingly soluble cation or anion compounds, or hydrated or unhydrated oxides or hydroxides of amphoteric metals.

DESCRIPTION OF THE PREFERRED EMBODIMENTS

Suitable metals for use in cation compounds are Mg, Zn, Ce, La, Fe, Mn, Co. With regard to anion compounds, suitable anions are $MoO_4^{--}$, $WO_4^{--}$, and $PO_4^{---}$. Hydrated or unhydrated oxides or hydroxides of amphoteric metals that are suitable are those of Si, Ti and Sb.

Advantageously, there may be used salts of the above listed cations and anions.

The insoluble cation and anion compounds may be deposited onto the surface of the chromium dioxide particles, if desired, said compounds being in admixture with one another, or by successive depositions. They may be used also in admixture with other insoluble compounds such as, for instance, compounds containing aluminum, calcium, strontium, barium, lead, etc.

The amount of deposited compound or compounds may vary within wide limits, and generally will be from 0.1 to 25 percent by weight with respect to the $CrO_2$.

For the cation compounds, an amount of from about 0.1 to 10 percent by weight is generally quite effective, and such range is also equally effective when using hydrated or unhydrated oxides or hydroxides of amphoteric metals. For the anionic compounds, an amount of from about 0.5 to 25 percent by weight is suitable.

The deposition of the modifying compound onto the surface of the $CrO_2$ particles may be achieved by any of the methods known in the art. For instance, the cations, the oxides and hydroxides, and/or the anions may be admixed with an aqueous suspension of the $CrO_2$ particles (with the cation and/or anion compound desirably being in the form of a soluble salt), and precipitation may be provoked ay an exchange reaction. Or the $CrO_2$ may be admixed with the pre-formed compound.

Other processes for the precipitation of the insoluble compounds may be effected, for instance, by adjustment of the pH, hydrolysis, electrolysis, salt formation, etc. Sometimes it may be convenient to operate in an organic solvent medium; or to expose the particles of $CrO_2$ to vapor containing the modifying compound or a precursor thereof; or to dry-mix; etc.

In general, after the deposition, rinsing is carried out in order to remove excess coating. This is followed by drying which, in general, is conveniently carried out at about 100° C. Of course, temperatures exceeding 100° e.g. 200° to 300° C, may also be utilized, e.g., to remove undesired precipitated hydrated compounds as well as to render the coating more compact and stable.

The process herein described may be applied to any kind of modified or unmodified chromium dioxide. It is preferable, however, to use chromium dioxides of a high coercive force, greater than 300 Oersteds, with a magnetization saturation exceeding 70 electromagnetic units per gram and with a residual magnetization greater than 35 electromagnetic units per gram. For this purpose it is highly suitable to use a lanthanum-modified chromium dioxide obtained according to the procedures described in said Italian Patent application No. 23466 A/72, and in said U.S. application by Ugo Montiglio et al entitled "Modified Chromium Dioxide and Method of Preparing the Same".

The magnetic characteristics are not apprecial altered by the above described treatments. Indeed, the coercive force remains essentially unaltered, and the magnetization drops only very slightly depending upon the coating used.

Before being subjected to treatment, the chromium dioxide to be treated is thoroughly ground and preferably washed. It is then suspended in water or in a suitable solvent until a slurry has been formed, desirably in a concentration of 50–200 g of $CrO_2$ per liter.

The greater stability displayed by the products treated according to the herein described method, with respect to water and to easily oxidizable organic substances, may be determined according to several different kinds of measurements.

One method for measuring the reactivity towards water consists in determining the quantity of chromium that is dissolved after a predetermined period of time.

One example of such method, and used in the examples given hereinafter, is as follows:

10 g of $CrO_2$ are suspended in 100 cc of distilled $H_2O$ at room temperature (20° C), and the suspension is then stirred for 5 minutes at predetermined time intervals (every 8 hours).

After 30 minutes, 24 hours and 72 hours residence times of the product in the water, samples of the upper liquid are drawn from the suspension and, after filtering, are analyzed for the soluble Cr content in an atomic absorption spectrophotometer.

Another method that has proven most effective in differentiating the long term stability of the various samples consists in carrying out a solubility test of the $CrO_2$ in water, but for much longer periods of time and at a temperature of 65° C, The procedure is as follows:

3 g of $CrO_2$ are placed into a carefully closed vessel containing 60 cc of distilled $H_2O$, and are suitably dispersed by means of a vibrating stirrer running for 2 hours.

The vessel is then placed into an oven where a constant temperature of 65° is maintained.

At predetermined time intervals (i.e., after 5, 12, 20 and 30 days) a 1 cc sample of the upper liquid is withdrawn and, after filtering, is analyzed for soluble Cr content in an atomic absorption spectrophotometer.

The following examples will further illustrate the invention. All parts are by weight unless otherwise stated.

EXAMPLE A: Preparation of lanthanum-modified $CrO_2$

A lanthanum modified $CrO_2$ was prepared as described in said copending United States application of Ugo Montiglio et al (Docket T.1676). The procedure was as follows:

Chromium chromate was used as the starting material for obtaining $CrO_2$, and was prepared as follows:

2000 g of $CrO_3$ were dissolved in distilled water, and the volume of the solution was brought to 4 liters.

The solution was placed into a 4-necked 10 liter flask fitted with a stirrer, a reflux cooler and thermometer.

To the solution were then added dropwise 160 cc of $CH_3OH$ and the solution was then brought to boiling and kept boiling for about 6 hours, until the alcohol had reacted, being transformed into $CO_2$.

10 cc were then drawn from the solution and the $Cr^{+6}/Cr^{+3}$ ratio was determined on this sample by iodometric titration of the hexavalent chromium and by the determination of the total chromium after oxidation with $Na_2O_2$. The ratio thus found was 1.5.

Then, 500 cc of the thus obtained solution were evaporated in a drier under vacuum, at 80° C for 48 hours.

Thereby was obtained a dark brown vitreous-like mass, and the $Cr^{+6}/Cr^{+3}$ was again determined and was shown to have remained unchanged. The water content was 10.7% [corresponding to 3 moles of $H_2O$ per mole of $Cr_2(CrO_4)_3$].

110.7 g of the foregoing brown mass were ground in an agate mortar together with 1 g of lanthanum in the form of $La_2O_3$, until complete homogenization was attained, and the granulometric size of the chromium chromate was 1–10μ.

This chromium chromate/lanthanum oxide mixture was then poured into a 130 ml titanium test tube, which was then placed into an autoclave made of stainless steel and having an internal volume of 240 ml.

In the air space between test tube and autoclave wall there were placed about 20 cc of distilled water.

The autoclave was heated in a muffle furnace maintained at a temperature of 380° C. At the start, inside the autoclave there was established, by means of an oxygen bottle, a pressure of 85 atmospheres.

During the heating, the pressure inside the autoclave rose due to (1) the oxygen that was formed, (2) water evaporated, and (3) the effect of thermal expansion of the gases. After 4 hours, the interior of the autoclave reached a temperature of 330° C, which temperature was then maintained for 130 minutes. The final pressure was 360 atmospheres.

After cooling, the pressure was released and the autoclave was opened.

In the container there had formed a black powder that was then ground in a ball mill and finally washed with water until the wash water was clear. The powder was then dried in an oven.

An X-ray diffractogram of the product showed that it was $CrO_2$.

Under an electronic microscope the product was shown to be made up of very homogeneous, needlelike particles of a length of from 0.15 and 0.55 micron, with an average length of 0.35 $\mu$, and having an average length/width ratio of 7:1.

Analysis with a fluorescent X-ray spectrometer showed that lanthanum was present in an amount of about 0.3 percent by weight of the product obtained, the remainder consisting of chromium (61.5%) and oxygen (38%, by difference).

The magnetic characteristics were as follows:
$H_c$ = 425 Oersteds
$\sigma s$ = 87.4 Gauss cc/g
$\sigma r/\sigma s$ = 0.52

The solubilities in water at 20° C were: 25, 65, and 101 ppm of dissolved Cr after 20 minutes, 24 hours and 72 hours, respectively.

The solubilities in water at 65° C were: 1650, 2900, 4100, and 5700 ppm of dissolved Cr after 5, 12, 20 and 30 days, respectively.

EXAMPLE 1

200 g of the foregoing lanthanum-modified chromium dioxide were slurried in deionized water under vigorous stirring at room temperature until attaining a solids concentration of 100 g/liter.

The thus obtained slurry, which has a pH of 3.5, was then treated, with stirring, at room temperature for about 10 minutes, with 5.86 g of $La_2O_3$ dissolved in 200 cc of aqueous HCl diluted to a 1:8 ratio. Thereafter, over a period of 30 minutes and with continued stirring, there were admixed 13 g of $Na_2MoO_4.2H_2O$ dissolved in 100 cc of $H_2O$.

After having stirred the slurry for 15 minutes, there was added to it dropwise sufficient NaOH(2N) to raise the pH to 7.

After further stirring for 30 minutes, the slurry was filtered by suction under vacuum and was washed with deionized $H_2O$ until the wash water showed a resistivity greater than 30,000 $\Omega$/cc.

After drying for 24 hours at 110° C. the chromium dioxide treated with lanthanum molybdate showed the following magnetic characteristics:
$H_c$ = 415 Oersteds
$\sigma_s$ = 81.4 Gauss cc/g
$\sigma_r/\sigma_s$ = 0.52.

Solubility in water at 20° C = 7, 14, and 25 ppm of dissolved Cr after 20 minutes, 24 hours and 72 hours, respectively.

Solubility in water at 65° C = 220, 380, 450, and 510 ppm of dissolved Cr, after 5, 12, 20 and 30 days, respectively.

EXAMPLE 2

Following the procedure of Example 1, there were added 36.5 cc of a 1M solution of $BaCl_2$ and thereafter 8.75 g of $Na_2MoO_4.2H_2O$ dissolved in 150 cc of deionized $H_2O$.

This solution was then brought up from a pH of 5.3 to a pH of 7.0 by the addition of 5 cc of NaOH (concentration = 90 g/liter).

The whole was then filtered, washed and dried, as previously described. The results were as follows:
$H_c$ = 420 Oersteds
$\sigma_s$ = 80.6 Gauss cc/g
$\sigma_r/\sigma_s$ = 0.50

Solubility in $H_2O$ at 20° C = 5, 13, and 17 ppm of dissolved Cr after 24 minutes, 24 hours and 72 hours, respectively.

Solubility in $H_2O$ at 65° C = 92, 120, 170, and 260 ppm in dissolved Cr after 5, 12, 20 and 30 days, respectively.

EXAMPLE 3

Following the procedure of Example 1, to the solution were added 61 g of $MgSO_4.7H_2O$ dissolved in 200 cc of $H_2O$ and 81.5 g of $Na_2WO_4.2H_2O$ dissolved in 200 cc of $H_2O$. This mixture was thereafter filtered, washed and dried at 110° C. The results were as follows:
$H_c$ = 420 Oersteds
$\sigma_s$ = 66.1 Gauss cc/g
$\sigma_r/\sigma_s$ = 0.54

Solubility in $H_2O$ at 20° C = 9, 16 and 31 ppm of dissolved Cr after 20 minutes, 24 hours and 72 hours, respectively.

Solubility in $H_2O$ at 65° C = 650, 1150, 1400 and 1920 ppm in dissolved Cr after 5, 12, 20 and 30 days, respectively.

EXAMPLE 4

Following the procedure of Example 1, there were added 34.5 g of $Ca(NO_3)_2.4H_2O$ dissolved in 100 cc of $H_2O$ and thereafter 49.6 g of $Na_2WO_4.2H_2O$ dissolved in 200 cc of $H_2O$.

The pH was brought up to 8.0 by the addition of NaOH(2N). After filtering, washing and drying at 110° C, the following results were obtained:
$H_c$ = 415 Oersteds
$\sigma_s$ = 70.2 Gauss cc/g
$\sigma_r/\sigma s$ = 0.55

Solubility in $H_2O$ at 20° C = 5, 14 and 24 ppm of dissolved Cr after 20 minutes, 24 hours and 72 hours, respectively.

Solubility in $H_2O$ at 65° C = 410, 520, 680 and 740 ppm of dissolved Cr after 5, 12, 20 and 30 days, respectively.

EXAMPLE 5

A washed $CrO_2$ cake, obtained by the synthesis method of Example A, was slurried in deionized water until there was obtained a slurry having a concentration of 100 g/liter.

200 g of $CrO_2$ were treated at room temperature and under stirring for a period of 10 minutes, with 150 cc of an aqueous solution containing 43.5 g of $Na_2HPO_4.12H_2O$.

The pH of the slurry rose to 7.4. After stirring for 15 minutes, 150 cc of an aqueous solution containing 30.8 g of $MnSO_4.H_2O$ were added at a rate of about 2 ml/min.

The pH of the mixture was then brought up from 4.6 to 7.0 by the addition of 65 cc of NaOH (concentration = 90 g/liter) at a rate of about 2 cc/min, under constant stirring.

The filtering, washing and drying were carried out as in Example 1, The product showed the following results:

$H_c$ = 425 Oersteds
$\sigma_s$ = 74.4 Gauss cc/g
$\sigma_r/\sigma_s$ = 0.49

Solubility in $H_2O$ at 20° C = 17, 28 and 41 ppm of dissolved Cr after 20 minutes, 24 hours and 72 hours, respectively.

Solubility in $H_2O$ at 65° C = 105, 215, 310 and 550 ppm of dissolved Cr, after 5, 13, 20 and 30 days, respectively.

EXAMPLE 6

Following the procedure of the preceding example, there were added 10 cc of an aqueous solution containing 11.5 g of $Na_2HPO_4$ and thereupon there were added 100 cc of an aqueous solution containing 16 g of $Pb(NO_3)_2$. The pH was raised from 2.7 to 7.0 by the addition of 19 cc of NaOH (concentration = 90 g/liter). The results obtained after the usual finishing operations were:

$H_c$ = 410 Oersteds
$\sigma_s$ = 80.4 Gauss cc/g
$\sigma_r/\sigma_s$ = 0.50

Solubility in $H_2O$ at 20° C = 1, 7 and 19 ppm of dissolved Cr after 20 minutes, 24 hours and 72 hours, respectively.

Solubility in $H_2O$ at 65° C = 270, 840, 1335, 1970 ppm of dissolved Cr after 5, 12, 20 and 30 days, respectively.

EXAMPLE 7

The slurry obtained by slurrying 200 g of $CrO_2$ in 2 liters of deionized $H_2O$, prepared according to Example A, was heated to 60° C and maintained at this temperature throughout the treatment.

Two solutions, one obtained by dissolving 36.6 g of $Na_2HPO_4.12H_2O$ in 150 cc of $H_2O$ and the other by dissolving 27.5 g of $ZnSO_4.H_2O$ in 150 cc of $H_2O$, were simultaneously added to the slurry at a rate of about 3 cc/min.

The slurry was then brought up to a pH of 8.0 by the dropwise addition of NaOH(2N).

After stirring for 30 minutes, washing and filtering, the filter cake was dried for 8 hours at 250° C. The following results were obtained:

$H_c$ = 405 Oersteds
$\sigma_s$ = 77.0 Gauss cc/g
$\sigma_r/\sigma_s$ = 0.52

Solubility in $H_2O$ at 20° C = 17, 23 and 41 ppm of dissolved Cr after 20 minutes, 24 hours and 72 hours, respectively.

Solubility in $H_2O$ at 65° C = 710, 1320, 1880 and 2400 ppm of dissolved Cr after 5, 12, 20 and 30 days, respectively.

EXAMPLE 8

Following the procedure of Example 5, there were added 300 cc of an aqueous solution containing 133 g of $Na_2HPO_4.12H_2O$, and then 200 cc of an aqueous solution containing 123.5 g of $Al_2(SO_4)_3.12H_2O$. The pH of the mixture was then raised from a pH of 2.3 to 7.0 by the addition of NaOH(2N). The results obtained after the usual finishing operations were:

$H_c$ = 385 Oersteds
$\sigma_s$ = 66.0 Gauss cc/g
$\sigma_r/\sigma_s$ = 0.56

Solubility in water at 20° C = 2,7 and 12 ppm of dissolved Cr after 20 minutes, 24 hours and 72 hours respectively.

Solubility in $H_2O$ at 65° C = 220, 310, 350 and 400 ppm of dissolved Cr after 5, 12, 20 and 30 days, respectively.

EXAMPLE 9

100 g of $CrO_2$ of the type of Example A, washed and slurried in water until forming a slurry at a solids concentration of 100 g/liter, were treated with 40 cc of a solution of $H_2SiF_6$ (equivalent to a concentration of 50 g of $SiO_2$ per liter) and simultaneously adding a sufficient quantity of NaOH(2N) to maintain the pH between 2.5 and 3. The Na fluorosilicate thus formed was then hydrolized by the further addition of NaOH(2N), over a period of one hour, until the pH reached 8.0.

The $CrO_2$ that resulted therefrom, which contained about 2% of $SiO_2$, was separated and then finished according to the procedure described in Example 1. The results were as follows:

$H_c$ = 400 Oersteds
$\sigma_s$ = 84.9 Gauss cc/g
$\sigma_r/\sigma_s$ = 0.44

Solubility in water at 20° C = 8, 45 and 60 ppm of dissolved Cr after 20 minutes, 24 hours and 72 hours, respectively.

EXAMPLE 10

To a $CrO_2$ slurry (of the same type as used in Example 9) with a pH of 8, on which had been precipitated 2% of $SiO_2$ from $H_2SiF_6$ as described in Example 9, were added 20 cc of a $TiOSO_4$ solution (equivalent to a concentration — 50 g of $TiO_2$ per liter). Thereafter the whole was neutralized with NaOH until reaching a pH of 8.0 and then maintained for 1 hour at 50° C. The finished product, prepared as in Example 9, gave the following results:

$H_c$ = 410 Oersteds
$\sigma_s$ = 83.2 Gauss cc/g
$\sigma_r/\sigma_s$ = 0.48

Solubility in $H_2O$ at 20° C = 4, 30 and 45 ppm of dissolved Cr after 20 minutes, 24 hours, and 72 hours, respectively.

EXAMPLE 11

100 g of $CrO_2$ of the type used in Example 2, washed and dried, were finely ground and then exposed in a wetting apparatus to a temperature of 22° C until attaining a humidification of 2%. The $CrO_2$ was then suspended in n-hexane (200 cc) and, under stirring and while avoiding contact with the air moisture, there were added 10 g of $SiCl_4$. After addition was completed, the slurry was reflux-heated for 45 minutes and then evaporated completely at reduced pressure in a rotating evaporator. The resulting product was then suspended in deionized $H_2O$, filtered, and washed until the wash water showed no Cl ions.

The cake was then dried, first at 60° C at reduced pressure, and then for 3 hours at 110° C. The results were as follows:

$H_c$ = 320 Oersteds $\sigma_s = 79.0$ Gauss cc/g
$\sigma_r/\sigma_s = 0.46$

Solubility in $H_2O$ at 20° C = 11, 17 and 43 ppm of Cr after 20 minutes, 24 hours and 72 hours, respectively.

EXAMPLE 12

A washed $CrO_2$ cake obtained by the method of Example 1, was slurried in deionized water until obtaining a slurry having a solids concentration of 100 g/liter.

100 g of $CrO_2$ were treated at room temperature and under stirring with 10 cc of sulphuric $Ti^{IV}$ solution in such concentration as to contain 0.5 g of anhydrous $TiO_2$. Thereafter, under stirring, there were added 30 cc of an aluminum sulfate solution at a concentration equivalent to 50 g $Al_2O_3$ per liter.

After homogenization, precipitation of the Ti and Al hydrated oxides was affected by neutralizing with NaOH(2N) to a pH of 7.8 using the technique previously described, including the heating at 50° C. The filtering, washing and drying were carried out as described in Example 1.

The ground product gave the following results:
$H_c = 435$ Oersteds
$\sigma_s = 84.0$ Gauss cc/g
$\sigma_r/\sigma_s = 0.55$ Solubility in $H_2O$ at 20° C = 5, 15, and 20 ppm of Cr after 20 minutes, 24 hours and 72 hours, respectively.

EXAMPLE 13

A slurry containing 100 g of $CrO_2$ per liter, similar to that used in Example 1, was brought to a pH of 7 by adding aqueous ammonia, and thereafter was treated with 20 cc of a sodium silicate solution (equivalent to a concentration of 50 g of anhydrous $SiO_2$ per liter; obtained by dilution of a solution concentrated to 40 Be and having a ratio $SiO_2/Na_2O = 3.3:1$). After homogenization through stirring, there were added 40 cc of an aluminum sulfate solution (obtained by dissolving in water, acidified with $H_2SO_4$, a commercial aluminum sulfate equivalent to 18 percent by weight of $Al_2O_3$).

After a second homogenization, the slurry, the pH of which had dropped to 3.5, was neutralized with NaOH(2N) to a pH of 7.8, thereafter completing neutralization of the basic sulfates by heating at 50° C for an additional 30 minutes.

The slurry was then filtered, washed in deionized water until the mother liquor showed a resistivity greater than 100,000Ω/cc, and the resulting cake was then dried in an oven, under vacuum at 60° C until reaching a constant weight, whereupon the drying was completed to 100° C for 3 hours.

After dry grinding, the product displayed the following characteristics:
$H_c = 330$ Oersteds
$\sigma_s = 83.8$ Gauss cc/g
$\sigma_r/\sigma_s = 0.50$ Solubility in $H_2O$ at 20° C = 8, 15 and 21 ppm of dissolved Cr after 20 minutes, 24 hours, and 72 hours, respectively.

Variations can, of course, be made without departing from the spirit and scope of the invention.

Having thus described the invention, what is desired to be secured by Letters Patent and hereby claimed is:

1. A stabilized composition consisting essentially of ferromagnetic chromium dioxide particles having deposited on the surface thereof a coating consisting of at least one compound selected from the group consisting of hydrated and anhydrous oxides of silicon, said compound being present in an amount of from about 0.1 to 25 percent by weight based on the chromium dioxide.

2. The composition of claim 1, wherein said chromium dioxide is a modified chromium dioxide.

3. The composition of claim 1, wherein said compound is present in an amount of from about 0.1 to 10 percent by weight.

4. A stabilized composition consisting essentially of ferromagnetic chromium dioxide particles having deposited on the surface thereof a coating consisting essentially of at least one compound selected from the group consisting of hydrated and anhydrous oxides of titanium, said compound being present in an amount of from about 0.1 to 25 percent by weight based on the chromium dioxide.

5. The composition of claim 4, wherein said chromium dioxide is a modified chromium dioxide.

6. The composition of claim 4, wherein said compound is present in an amount of from about 0.1 to 10 percent by weight.

7. A stabilized composition consisting essentially of ferromagnetic chromium dioxide particles having deposited on the surface thereof a coating consisting of hydrated or anhydrous oxides of silicon and titanium, said coating being present in an amount of from about 0.1 to 25 percent by weight based on the chromium dioxide.

8. The composition of claim 7, wherein said chromium dioxide is a modified chromium dioxide.

9. The composition of claim 7, wherein said compound is present in an amount of from about 0.1 to 10 percent by weight.

* * * * *

UNITED STATES PATENT OFFICE
CERTIFICATE OF CORRECTION

Patent No. 4,068,038   Dated January 10, 1978

Inventor(s) Ugo Montiglio et al

It is certified that error appears in the above-identified patent and that said Letters Patent are hereby corrected as shown below:

Column 3, line 22: "100°" should read -- 100°C --; line 40: "apprecial" should read -- appreciably --.

Column 4, line 12: "65°" should read -- 65°C --.

Column 5, line 39: "has" should read -- had --.

Column 6, line 10: "$\sigma_r \sigma_s$" should read -- $\sigma_r/\sigma_s$ --.

Column 7, line 11: "5, 13, 20 and 30" should read -- 5, 12, 20 and 30 --.

Column 8, line 39: "concentration -" should read -- concentration of --.

Signed and Sealed this

Eighth Day of August 1978

[SEAL]

Attest:

RUTH C. MASON
Attesting Officer

DONALD W. BANNER
Commissioner of Patents and Trademarks